United States Patent
Rose et al.

(12) 
(10) Patent No.: US 6,333,830 B2
(45) Date of Patent: Dec. 25, 2001

(54) LOW RESISTANCE COIL STRUCTURE FOR HIGH SPEED WRITER

(75) Inventors: Chuck Rose; Zhupei Shi, both of San Jose; Kenneth E. Knapp, Livermore, all of CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/189,059

(22) Filed: Nov. 9, 1998

(51) Int. Cl.[7] .............................. G11B 5/17; G11B 5/147
(52) U.S. Cl. ............................................ 360/123; 360/126
(58) Field of Search ....................... 360/125, 126, 360/123

(56) References Cited

U.S. PATENT DOCUMENTS

| | | | |
|---|---|---|---|
| 4,684,438 | * 8/1987 | Lazzari | 216/22 |
| 5,065,270 | * 11/1991 | Koyanagi et al. | 360/123 |
| 5,130,877 | * 7/1992 | Hsie et al. | 360/126 |
| 5,181,152 | * 1/1993 | Yan et al. | 360/126 |
| 5,184,394 | * 2/1993 | Hsie et al. | 29/603.14 |
| 5,198,948 | * 3/1993 | Stover et al. | 360/124 |
| 5,581,429 | * 12/1996 | Furuichi et al. | 360/126 |
| 5,973,891 | * 10/1999 | Neumann | 360/126 |
| 5,991,119 | * 11/1999 | Boutaghou et al. | 360/103 |

FOREIGN PATENT DOCUMENTS

| | | | |
|---|---|---|---|
| 2 184 606 | * 6/1987 | (GB) . | |
| 60-127514 | * 7/1985 | (JP) . | |
| 60-254403 | * 12/1985 | (JP) . | |
| 61-011915 | * 1/1986 | (JP) . | |
| 63-087608 | * 4/1988 | (JP) . | |
| 63-117307 | * 5/1988 | (JP) . | |

* cited by examiner

*Primary Examiner*—William Klimowicz
(74) *Attorney, Agent, or Firm*—Carr & Ferrell LLP

(57) ABSTRACT

The present invention provides a thin film write head having an upper and lower pole structures and conductor turns forming a winding for generating magnetic flux. The conductor is formed with a non-planar top surface. The winding of the present invention may be formed of lower and upper turns. The upper turns may be formed with a non-planar top surface, a non-planar bottom surface, or both. It is preferred that the bottom surface of the upper conductor turns be coherent with the non-planar top surface of the lower conductor turns. The non-planar top surface may be formed by removing corners formed during deposition between a generally planar top surface and abutting side walls. The corners may be removed by ion milling to form the non-planar top surface. The conductor may be copper with the non-planar top surface having sloping facets. The thin film write head of the present invention may be utilized to provide an improved data storage and retrieval apparatus. The preferred embodiment provides reduced coil resistance thereby reducing Johnson Thermal Noise and power dissipation. It also allows for reduced yoke length and reduced stack height while providing low apex angles to expand and improve yoke material deposition thereby improving head response and operational frequency.

24 Claims, 7 Drawing Sheets

LOW RESISTANCE COIL STRUCTURE FOR HIGH SPEED WRITER

BACKGROUND

1. Field of the Invention

The present invention relates to the field of magnetic write heads.

2. Description of Related Art

Data is stored on magnetic media by writing to the magnetic media using a write head. Magnetic media can be formed in any number of ways, such as tape, floppy diskette, and hard disk. Writing involves storing a data bit by utilizing magnetic flux to set the magnetic moment of a particular bit or area on the magnetic media. As data density is improved by placing bits closer together, larger magnetic flux is required to set the bits to prevent them from inadvertently being changed by adjacent bits, or by stray magnetic flux.

In addition to improving density, the rate or frequency that data is stored to the media is an important measure of the operational performance of the write head. The operating frequency is determined, in part, by the structures and materials of the write head.

Thin film heads commonly employ separate write and read heads and are typically formed by depositing and etching layers of magnetic, non-magnetic, dielectric, and electrically conductive materials to form the structures of the head. The structures of the head, such as a lower pole structure, a write gap, an upper pole structure, and conductors are fabricated in separate steps. The conductors form a winding that provides magnetic flux along a path through the upper pole structure, across the write gap and into the lower pole structure. The magnetic flux crossing the write gap acts across an air bearing to set the magnetic moment of the media.

To improve the operating frequency of the write head, the overall length of the write head from the air bearing surface is reduced to decrease the magnetic flux path length. To accomplish this, the conductor winding may be moved closer to the air bearing surface. The cross sectional area of the conductor also may be reduced to decrease winding size.

Reducing conductor cross-section and distance to the air bearing surface, however, presents problems. Decreasing conductor size, for example, increases the resistance of the conductor winding causing a potential problem with Johnson Thermal Power Noise. Johnson Thermal Power Noise is given by:

$$\text{Johnson Thermal Power Noise} = 8\Pi k_B TR\Delta\omega$$

where

T=temperature

R=resistance of the coil $\Delta\omega$=operating frequency bandwidth

As the resistance and operating frequency increase, Johnson Thermal Power Noise poses a greater problem.

Yet another way to improve the operating frequency of the write head is to use high moment materials to form the pole structures. Conventional thin film head design, however, limits the type of materials available for use. High moment materials generally are deposited by vacuum deposition and are prone to cracking when deposited over steep surfaces. As the size of the pole structures are reduced and the conductors are moved closer to the air bearing surface, the layers of conductors forming the winding typically present steep angles. These steep angles limit the deposition methods and type of materials available for forming the upper pole structure, thus presenting impediments to increasing the operating frequency of the write head.

BRIEF SUMMARY OF THE INVENTION

The present invention provides a thin film write head having an upper and lower pole structures and conductor turns forming a winding for generating magnetic flux in the upper pole structure. The conductor is formed with a non-planar top surface. The winding of the present invention may be formed of lower and upper turns. The upper turns may also be formed with a non-planar top surface, a non-planar bottom surface, or both. It is preferred that the bottom surface of the upper conductor turns be coherent with the upper surface of the lower conductor turns.

The non-planar top surfaces may be formed by removing corners formed between a generally planar top surface and abutting side walls. The corners may be removed by ion milling to form the non-planar top surface. The conductor turns may be formed of copper with the non-planar top surface having sloping facets.

The preferred embodiment of the present invention provides reduced coil resistance thereby reducing Johnson Thermal Noise and power dissipation. It also allows for reduced yoke length and reduced stack height while providing low apex angles thereby expanding and improving yoke material deposition to improve head response and operational frequency.

The write head of the present invention may be utilized to provide an improved data storage and retrieval apparatus.

DETAILED DESCRIPTION OF THE INVENTION

The Preferred Embodiments of the Invention

FIGS. 1–3

Figure 1:
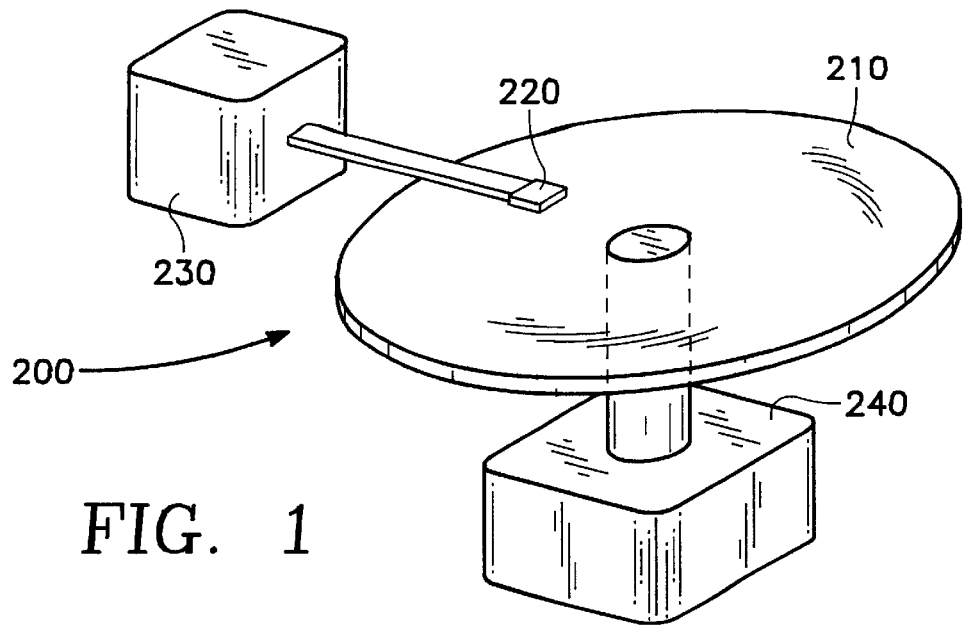
FIG. 1 depicts a data storage and retrieval apparatus embodying the thin film write head of the present invention.

FIG. 1 shows the thin film write head of the present invention embodied in a disk type magnetic data storage and retrieval apparatus 200. The write head of the present invention is located within a merged head assembly 220 which rides above a magnetic storage media 210, depicted in FIG. 1 as a rotatable hard disk type storage media. The hard disk 210 is coupled to a motor 240 to provide rotation of the disk relative to the head assembly 220. An actuating means 230 may be used to position the head assembly 220 above the surface of the media 210 to read and write data in the form of magnetic bits from and to the media 210. The data storage and retrieval apparatus 200, typically has several hard disks 210 and several corresponding head assemblies 220.

Figure 2:
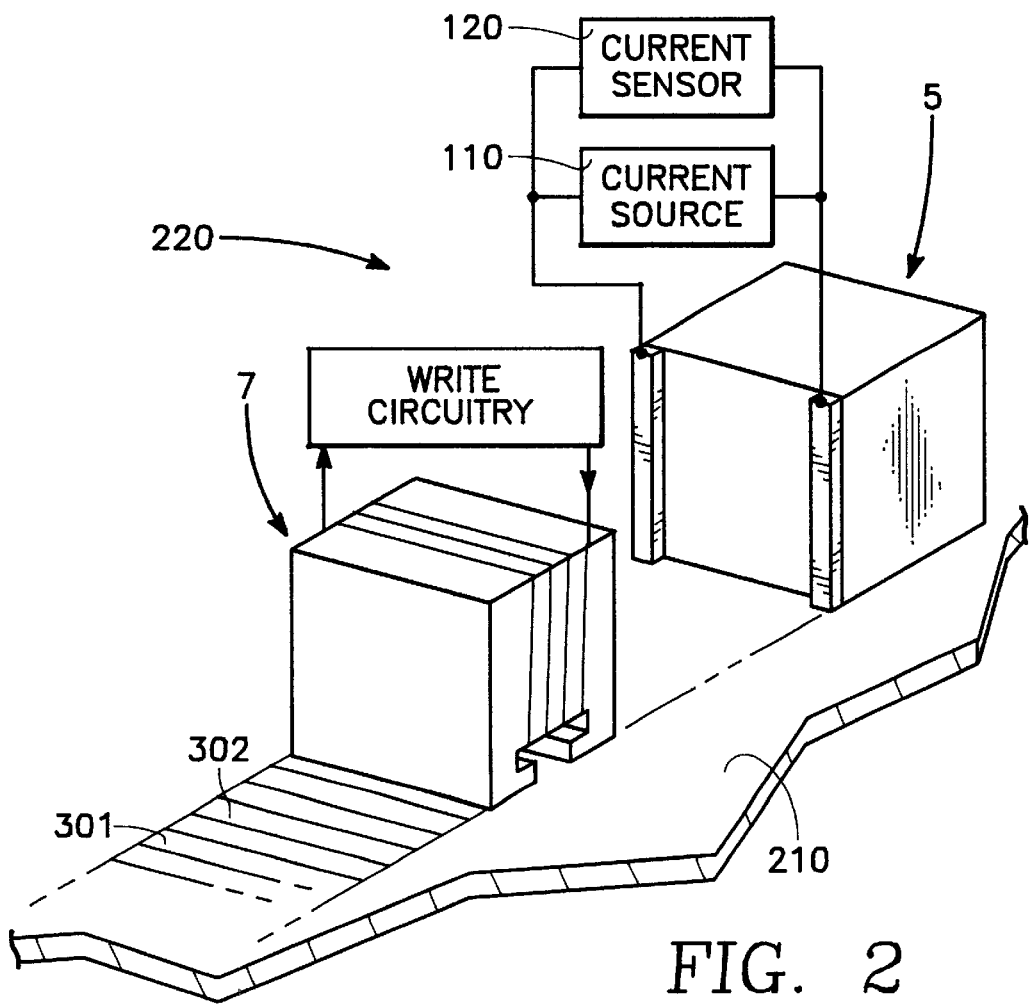
FIG. 2 illustrates a basic functional block diagram of the thin film head of the present invention.

FIG. 2 shows a simplified functional illustration of the head assembly 220. Merged head assemblies 220 are formed having a write head 7, used to write or set the magnetization of bits 301, 302 on the media 210, while a read head 5, reads the magnetization of those bits 301, 302 from the media 210. The depiction in FIG. 3 is a simplified functional representation of a merged head, the merged head of the present invention may be formed by techniques well known in the art, such as by masking, depositing, and etching successive layers to form the well known structures of the merged head 220.

Figure 3:
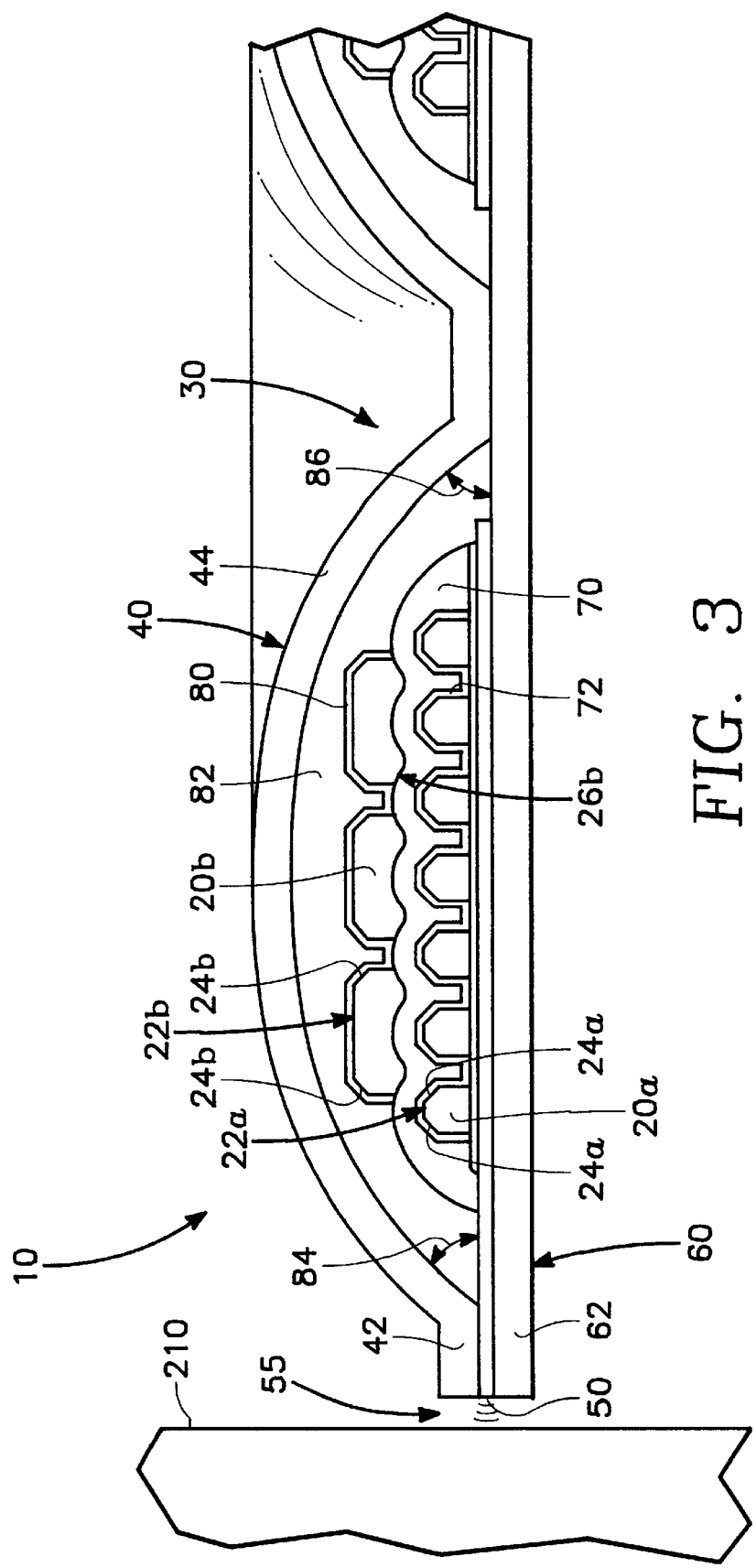
FIG. 3 is a cross-sectional view of a preferred embodiment of the thin film head of the present invention.

FIG. 3 is a cross sectional view of an embodiment of the thin film write head 10 of the present invention. Conductors 20a & 20b typically encircle a core 30 to produce magnetic flux which is coupled via an upper pole structure 40, across write gap 50, and into a lower pole structure 60. The flux generated across a write gap 50 between an upper pole tip 42 and a lower pole tip 62 writes across an air bearing 55 to the magnetic media 210 which is moved with respect to the write head 10.

With the embodiment of FIG. 3, lower conductors 20a form a lower winding having a plurality of turns around the core 30. The conductors 20a typically form a continuous conductor winding. The conductors 20a are formed with an upward facing non-planar top surface 22a. The non-planar top surface 22a, as will be discussed further below, may be formed by depositing conductor material and removing corners formed between a generally planar top surface and side walls so as to form faceted portions 24a in the top surface 22a of the conductor 20a.

An insulation layer 70 is formed over the lower conductors 20a. The insulation layer 70 may be formed of an organic material. The insulation layer may also have an optional inorganic insulation layer 72 formed of AlN, Alumina, or the like, 2,000 to 3,000 Å thick may be deposited to provide added insulation between the conductors 20a & 20b. The insulation layer 70 is non-planar and typically is formed with indentations located above, and preferably centered above, the spaces between adjacent lower conductors 20a.

Upper conductors 20b may be formed over the insulation layer 70 to form an upper conductor winding around the core 30. The upper conductors 20b may be formed over, or directly on, the non-planar insulation layer 70 so that a downward facing or bottom surfaces 26b of the upper conductors 20b are non-planar. As the insulation layers 70 & 72 are not planarized, the non-planar bottom surface 26b of the upper conductors 20b are formed coherent with the upper surface 22a of the lower conductors 20a.

It is presently preferred to form the upper conductors 22b larger than the lower conductors 22a. As such, in the preferred embodiment of FIG. 3, the width of an upper conductor 22b is wider than the width of a lower conductor 22a causing an upper conductor 22b to extend over several lower conductors 22a. This increases the cross sectional area of the upper conductors lowering the resistance of the winding.

Like the lower conductors 20a, the upper conductors 20b may be formed with a non-planar top surface 22b. The non-planar top surface 22b may be formed in the same manner as the non-planar top surface 22a of the lower conductors 20a.

The structure of the preferred embodiment of FIG. 3 allows the upper and lower conductors 20a & 20b to be moved closer to the air bearing 55 to minimize flux path length while minimizing the combined height of the upper and lower conductors 20a & 20b and allowing the yoke 44 to be formed over low apex angles 84 & 86. This improves yoke material deposition and improves operating frequency.

Furthermore, the preferred embodiment of FIG. 3 allows the upper conductors 20b to be formed with greater cross sectional area to reduce resistance, thereby reducing Johnson Thermal Noise and power dissipation of the winding while providing sufficient turns to ensure adequate flux through the write head 10. Additionally, the improved structure of the preferred embodiment of FIG. 3 lowers winding inductance and improves rise time, thereby improving operating frequency.

A cured resist layer 82 and an optional inorganic insulation layer 80 are formed over the upper conductors 20b. The resist layer 82 is formed with low apex angles 84 & 86, which allows for expanded yoke 44 deposition methods and materials. Preferably, apex angles 84 & 86 are formed less than about 45 degrees to allow for improved deposition and performance of high moment materials. Optimally, the apex angles 84 & 86 are formed at about 30 degrees.

The structure of the preferred embodiment of FIG. 3 improves the magnetic properties of the yoke 44 when it is formed of high magnetic moment materials deposited by vacuum deposition techniques such as sputtering, chemical vapor deposition, or the like. As such, it expands material selection for the yoke 44 of the upper pole structure 40 an allows the yoke to be formed of high moment magnetic materials, such as 55% FeN, CoZrTa, FeNX where X is Al, Rh, or the like, or any other high moment materials.

It is significant to note that with the present invention, although it is presently preferred to form each of the upper conductor windings 22b as discussed above, the upper conductor 20b need only be formed without the upper outer peripheral corner of the outermost turn of the upper conductor coil 20b, and without the upper inner peripheral corner of the innermost turn of the upper conductor coil 20b to allow a lower apex angles 84 & 86 for forming the yoke 44 over. With the present invention, therefore, it is possible to form only some of the conductors or conductor turns 20b & 20a, such as the inner and outer peripheral turns of the upper or the lower conductors 20b & 20a, with non-planar top surfaces 22b & 22a to provide shorter yoke 44 length and lower apex angles 84 & 86.

Preferred Method of Fabrication

FIGS. 4–15

Figure 4:
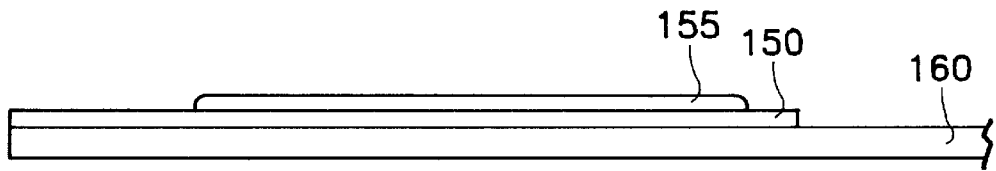
FIG. 4 is a cross-sectional view depicting partial fabrication of the preferred embodiment of FIG. 3.

Turning to FIG. 4, the lower pole structure is formed by depositing magnetic material to form a lower pole layer 160 over, or on, a substrate (not shown). A write gap layer 150 is deposited over the lower pole layer 160. Typically the write gap layer 150 is formed of a non-magnetic material, such as $Al_2O_3$. An optional organic insulation layer 155 may be deposited on the write gap layer 150. The write gap layer 150 normally is planarized prior to forming the lower conductors 20a of FIG. 3.

Figure 5:
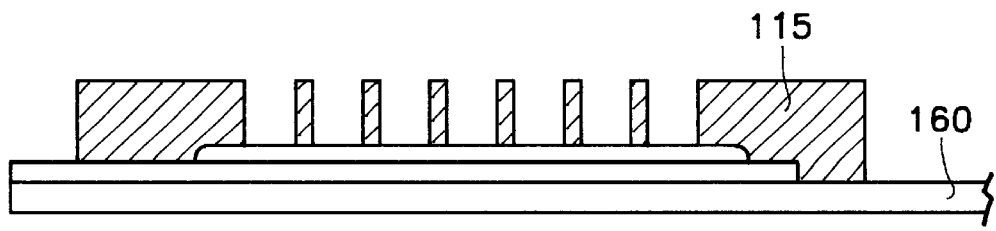
FIG. 5 depicts a resist pattern formed on the partially fabricated write head of FIG. 4.

Turning to FIG. 5, a resist layer, such as photoresist, is deposited over the write gap layer 150 and exposed to form a resist pattern 115 for depositing conductive material to form lower conductors.

Figure 6:
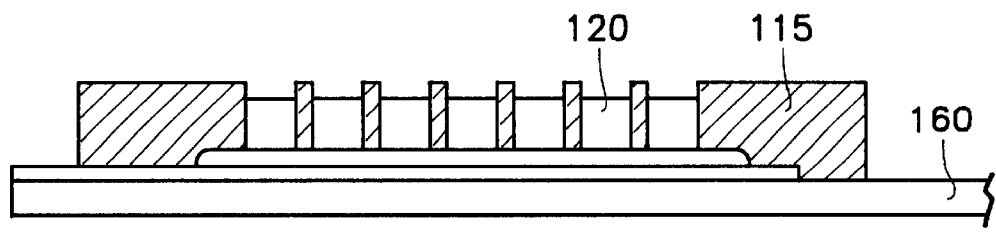
FIG. 6 depicts conductive material formed in the resist pattern of FIG. 5.
Figure 7:
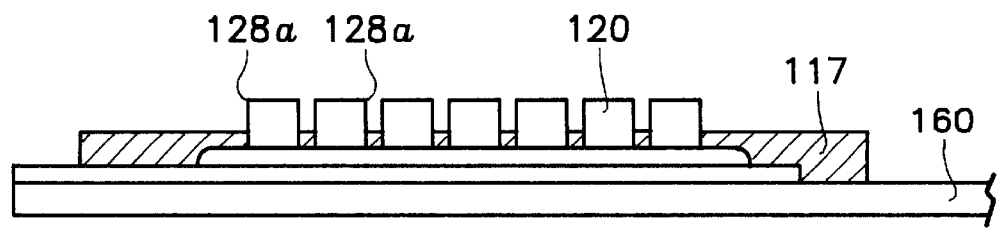
FIG. 7 depicts the partially fabricated write head of FIG. 6 after removal of a top portion of the resist pattern.

Turning to FIGS. 6 & 7, conductive material is deposited within the resist pattern to form the lower winding. It is presently preferred deposit copper by plating to form the lower winding. All, or preferably only a top portion of the resist pattern 115 is removed to leave a lower portion 117 remaining, as shown in FIG. 7. The remaining resist protects any underlying surfaces from etching and from conductor redeposition.

Figure 8:
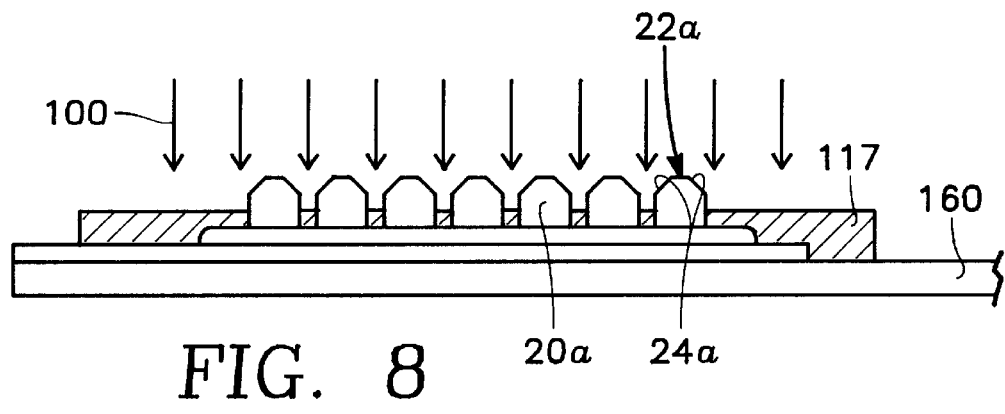
FIG. 8 depicts the partially fabricated write head of FIG. 7 during ion milling of the conductive material to form non-planar top surfaces.
Figure 8A:
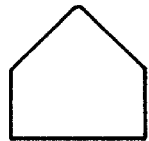
FIG. 8A & 8B depict non-exclusive alternate embodiments of the conductors.
Figure 8B:
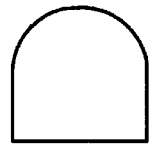

Turning to FIG. 8, a portion of the top surface of the conductors is etched to form the non-planar top surface. It is presently preferred to etch by ion milling 100 with etch parameters set so that the corners 128a of the deposited conductors of FIG. 7 are removed to leave facets or beveled portions 24a in the top facing surface 22a as shown in FIG. 8. This may be done with a zero degree milling angle. Other conductor material such as aluminum, gold, or silver, or other materials known in the art, may also be etched by ion milling, or by any other process known in the art, to remove the corners 128a to form the conductors 20a with non-planar top facing surfaces 22a. By way of non-exclusive example, FIGS. 8A–8B illustrate other possible non-planar top surfaced conductor formations. It is presently preferred, however, to form the non-planar top facing without sharp discharge points which could facilitate arcing surface as depicted in FIGS. 3 or 8B. It is possible to form the conductors without side walls so that the non-planar top facing surface meets at, or approximately at, the bottom surface.

Referring to FIG. 8, the ion milling process 100 causes removal of some of the remaining resist pattern 117 and also causes redeposition of the conductor material onto the remaining resist pattern. The remaining resist 117 is removed after the ion milling process, also removing any redeposition on the resist.

It is important to note that the etching process not only removes the corners of the deposited conductors, it also reduces the overall height of the conductors. As such, excess conductor material should be deposited so that the etching process ultimately produces the desired conductor height.

Figure 9:
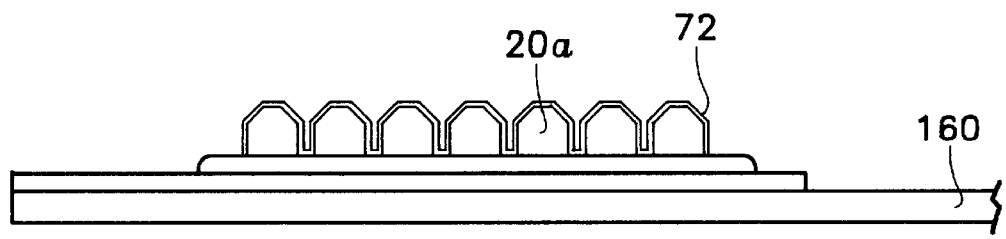
FIG. 9 depicts the partially fabricated write head FIG. 8 after ion milling, removal of the remaining resist, and deposition of an optional insulation layer.

Turning to FIG. 9, an optional inorganic insulation layer 72 may be deposited on the lower conductors 20a. The inorganic insulation layer 72 may be formed of AlN, Alumina, or other insulation material using chemical vapor deposition to form a thickness of about 2,000–3,000 Å.

Figure 10:
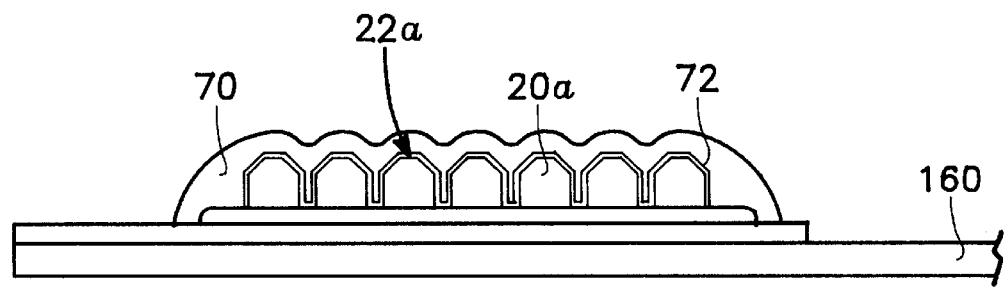
FIG. 10 depicts the partially fabricated write head of FIG. 9 with an additional insulation layer.

Turning to FIG. 10, an insulation layer 70, preferably formed of an organic material, is deposited over the conductors 20a so that the insulation layer 70 may be formed generally conformal with the top facing surfaces 22a of the conductors 20a. Hence, the insulation layer 70 is non-planar and typically is formed with indentations located above, and preferably centered above, the spaces between adjacent lower conductor 20a turns.

Figure 11:
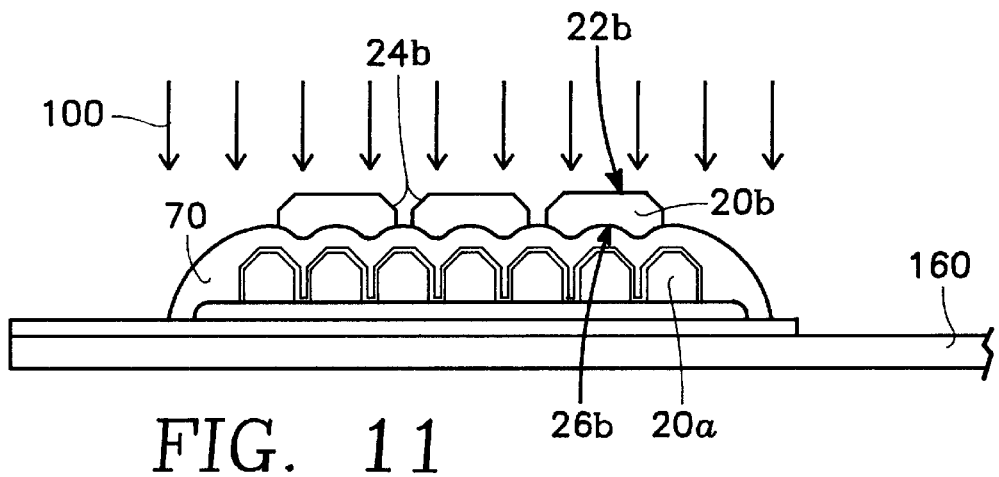
FIG. 11 depicts the partially fabricated write head of FIG. 10 with upper conductors formed over the insulation layers.

Turning to FIG. 11, upper conductors 22b are formed over the lower conductors using resist, masking, exposure, and removal to form a resist pattern as discussed above. Typically, a via (not shown) is formed to electrically connect the upper and lower conductor layers. After the conductor material is deposited within the resist pattern, the upper portion of the resist may be removed to etch the upper conductors 22b to remove the corners to form the non-planar top surfaces 22b, as discussed above.

Removing the corners of the upper conductors 22b, among other advantages, allows lower apex angles, while minimizing the distance between the conductors 20 and the air bearing surface. This allows for a shorter magnetic flux path length through the upper and lower pole structures. It also allows greater flexibility in selection of upper pole structure material and deposition processes to improve operating frequency.

Figure 16:
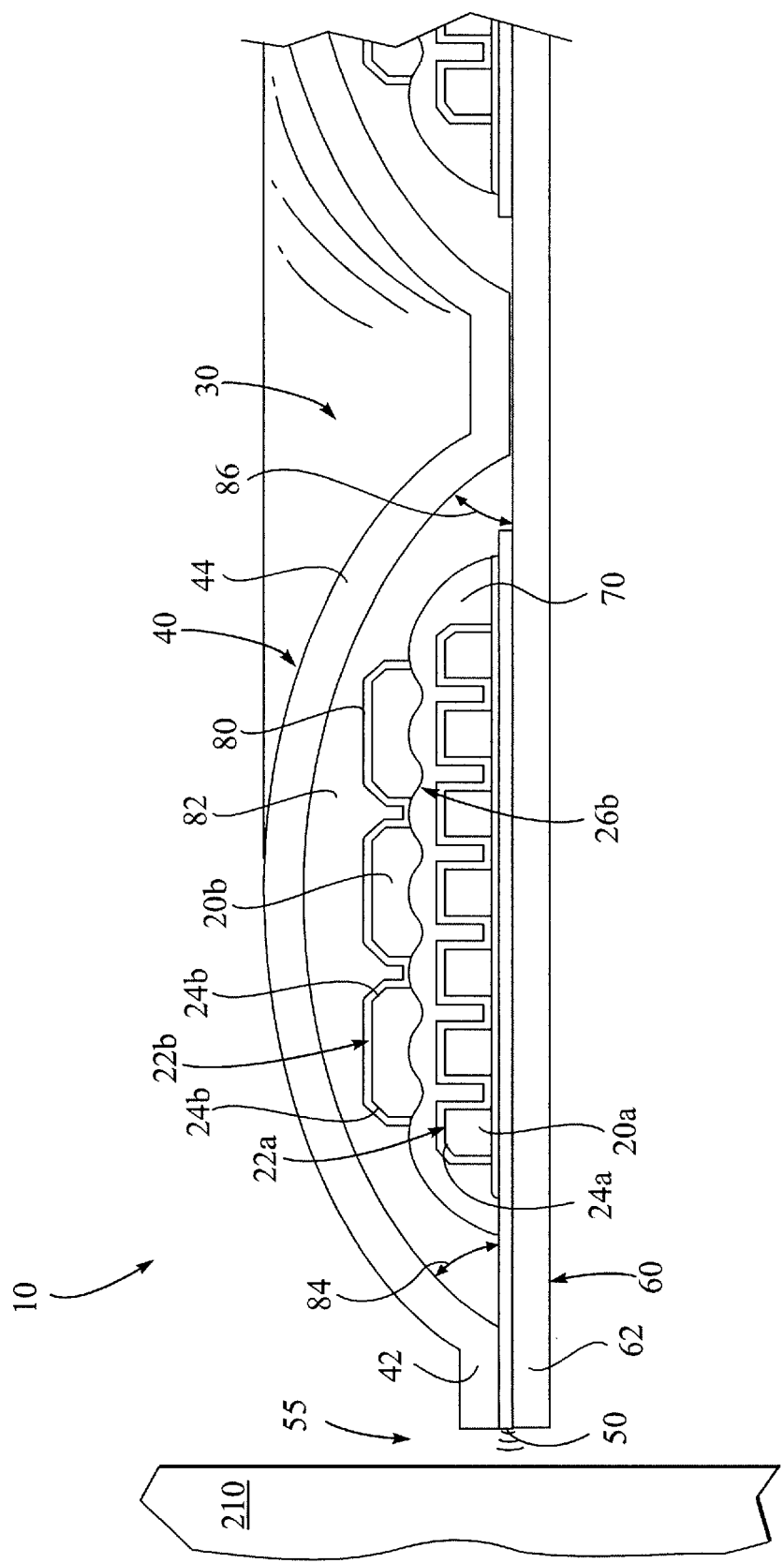
FIG. 16 is a cross-sectional view of an embodiment of the thin film head of the present invention.

As discussed above, although it is presently preferred to form each of the upper and lower conductor turns with the non-planar top surface, the upper or the lower conductors 20b need only be formed without the upper outer peripheral corner of the outermost turn of the winding and without the upper inner peripheral corner of the innermost turn of the winding to allow lower apex angles 84 & 86. With the present invention, therefore, it is possible to form only the innermost and outermost conductors of the upper or lower winding with non-planar top surfaces to provide shorter yoke length and lower apex angles 84 & 86, as shown in FIG. 16. As such, an additional resist layer may be deposited over the interior conductors of the winding prior to ion milling so that the rest of the conductors, which are located between the innermost and outermost conductors of the winding, are not etched.

The upper conductors 20b are deposited on the insulation layer 70 without planarizing either the insulation layer 70, or the optional insulation layer 72, so that the upper conductors 22b form with non-planar bottom surfaces 26b coherent with the top facing surfaces 22a of the lower conductors 20a.

This allows the upper conductors 20b to be formed with greater cross-sectional area to reduce the resistance of the coil to improve head response time and power consumption. Also, lowering the height of the winding allows for lower apex angles while minimizing the distance between the conductors and the air bearing surface.

Figure 12:
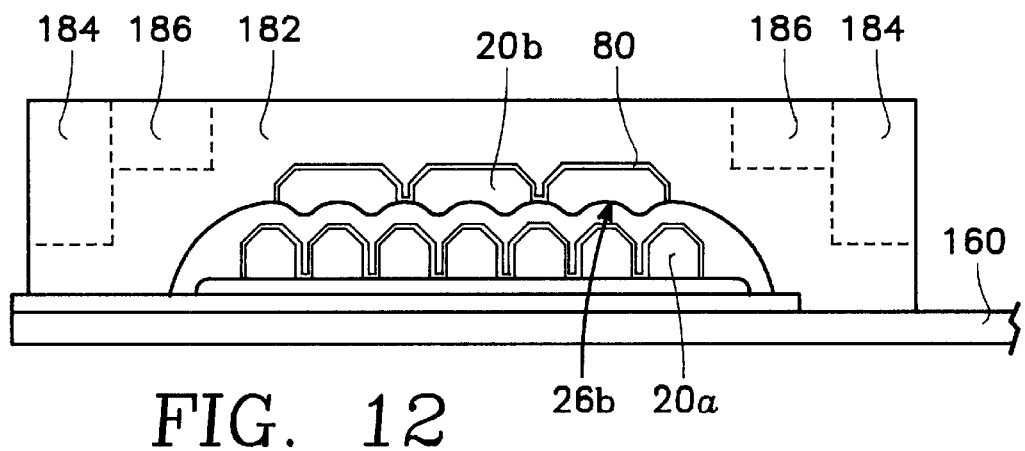
FIG. 12 depicts the partially fabricated write head of FIG. 11 with a resist layer formed over the upper conductors.
Figure 13:
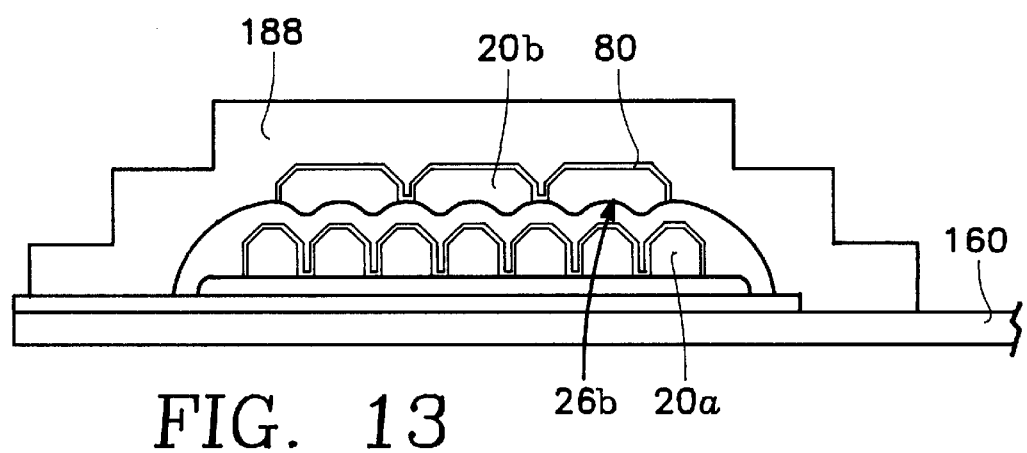
FIG. 13 depicts the partially fabricated write head of FIG. 12 after selective exposure and removal of the resist layer.
Figure 14:
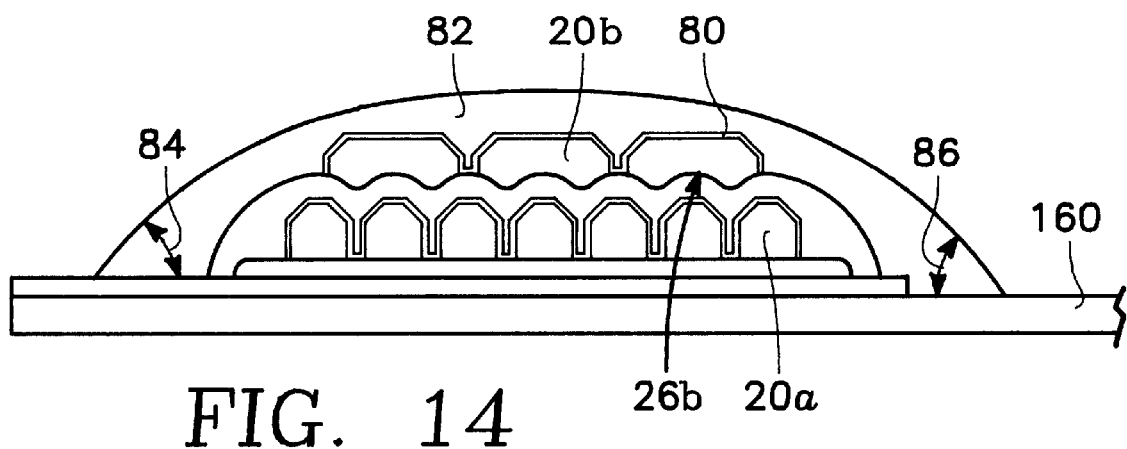
FIG. 14 depicts the partially fabricated write head of FIG. 13 after curing of the remaining resist.

Turning to FIGS. 12—14, a resist layer 182, preferably photoresist, is deposited over the conductors 20. The resist layer is masked and exposed twice, once with higher power to expose notches 184, and once with lower power to expose notches 186. The exposed resist is removed to form the resist structure 188 shown in FIG. 13. The resist is cured to form the cured resist layer 82 with low apex angles 84 & 86.

Figure 15:
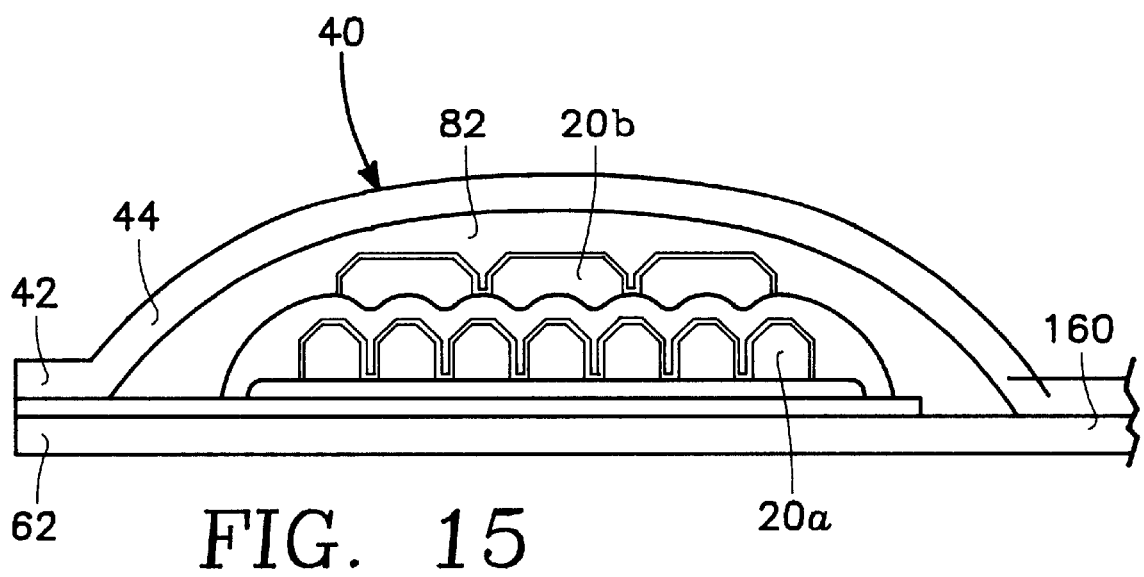
FIG. 15 depicts the partially fabricated write head of FIG. 14 having an upper pole structure formed on the cured resist.

Turning to FIG. 15, the upper pole structure 40 is deposited over the cured resist 82 to form the presently preferred thin film head structure of the present invention. Although it is presently preferred to deposit the upper pole structure material by vacuum deposition to expand material selection and deposition thickness accuracy, chemical vapor deposition, sputtering, plating, or other deposition technique known in the art may be employed.

Addition layers and forming may be employed as is known to one skilled in the art to provide the thin film head for adaptation in the data storage and retrieval apparatus.

While the preferred embodiments of the present invention have been described in detail above, many changes to these embodiments may be made without departing from the true scope and teachings of the present invention. The present invention, therefore, is limited only as claimed below and the equivalents thereof.

What we claim is:

1. A thin film write head comprising:
   a) a lower pole structure;
   b) a write gap structure;
   c) a winding having a plurality of turns of a conductor, the conductor having a top surface comprising generally planar faceted portions, wherein the winding has upper turns and lower turns, and wherein the conductor of the lower turns has a faceted top surface and the conductor of the upper turns has a non-planar bottom surface.

2. The thin film write head of claim 1 wherein the conductor of the upper turns has a faceted top surface.

3. The thin film write head of claim 1 wherein the top surface of the conductor of the lower turns and the bottom surface of the conductor of the upper turns are coherent.

4. A data storage and retrieval apparatus comprising:
   a) a magnetic recording media;
   b) a head assembly positioned adjacent the magnetic recording media comprising:
      (i) a read head; and
      (ii) a write head comprising:
         (1) a lower pole structure;
         (2) a write gap structure;
         (3) a winding having a plurality of turns of a conductor, the winding having upper turns and lower turns, and wherein the conductor of the lower turns has a non-planar top surface and the conductor of the upper turns has a non-planar bottom surface coherent with the top surface of the lower turns; and
         (4) an upper pole structure; and
   c) a motor coupled to the media so as to move the media with respect to the head assembly.

5. The data storage and retrieval apparatus of claim 4 wherein the conductor of the upper turns has a non-planar top surface.

6. The data storage and retrieval apparatus of claim 4 wherein the non-planar top surface of the lower turns comprises faceted portions.

7. The data storage and retrieval apparatus of claim 6 wherein the non-planar top surface of the conductor of the upper and lower turns being formed by removing corners formed between a generally planar top surface and side walls.

8. The data storage and retrieval apparatus of claim 6 wherein the non-planar top surface of the upper turns comprises faceted portions.

9. A thin film write head comprising:
   a) a lower pole structure;
   b) a write gap structure;
   c) a winding having a plurality of turns of a conductor, the conductor having a non-planar top surface;
   d) an upper pole structure; and
   e) wherein the winding comprises an inner turn and an outer turn, and wherein the inner turn and the outer turn have non-planar top surfaces, and comprising at least one turn located between the inner turn and the outer turn having a generally planar top surface.

10. The thin film write head of claim 9 wherein the non-planar top surfaces are formed by removing at least one corner disposed between the top surface and at least one abutting side wall.

11. A thin film write head comprising:
    a) a lower pole structure;
    b) a write gap structure;
    c) a winding having a plurality of turns of a conductor, the conductor comprising upper turns and lower turns, the conductor of the lower turns comprising a non-planar top surface and the conductor of the upper turns comprising a non-planar bottom surface including a concave portion; and
    d) an upper pole structure.

12. The thin film write head of claim 11 wherein the upper turns have lower and higher portions such that a lower portion of the bottom surface of the upper turns is disposed in a region defined by and extending from adjacent sidewalls of the lower turns.

13. The thin film write head of claim 12 wherein the top surface of the conductor of the lower turns and the bottom surface of the conductor of the upper turns are coherent.

14. The thin film write head of claim 13 wherein the conductor of the upper turns has a non-planar top surface.

15. The thin film write head of claim 14 wherein the surface of the conductor of the lower turns comprises faceted portions.

16. The thin film write head of claim 15 wherein the top surface of the conductor of the upper turns comprises faceted portions.

17. A thin film write head comprising:
    a) a lower pole structure;
    b) a write gap structure;
    c) a winding having a plurality of turns of a conductor, the conductor having a top surface comprising faceted portions;
    d) an upper pole structure; and
    e) wherein the winding has upper turns and lower turns, and wherein the conductor of the lower turns has a faceted top surface and the conductor of the upper turns has a non-planar bottom surface.

18. The thin film write head of claim 17 wherein the conductor of the upper turns has a faceted top surface.

19. The thin film write head of claim 18 wherein the top surface of the conductor of the lower turns and the bottom surface of the conductor of the upper turns are coherent.

20. A thin film write head comprising:
    a) a lower pole structure;
    b) a write gap structure;
    c) a winding having a plurality of turns of a conductor, the conductor comprising upper turns and lower turns, the conductor of the lower turns comprising a non-planar top surface and the conductor of the upper turns comprising a non-planar bottom surface;
    d) an upper pole structure;
    e) wherein the top surface of the conductor of the lower turns and the bottom surface of the conductor of the upper turns are coherent;
    f) wherein the conductor of the upper turns has a non-planar top surface; and
    g) wherein the top surface of the conductor of the lower turns comprises faceted portions.

21. The thin film write head of claim 20 wherein the top surface of the conductor of the upper turns comprises faceted portions.

22. A thin film write head comprising:
    a) a lower pole structure;
    b) a write gap structure;

c) a winding having a plurality of turns of a conductor, wherein the turns comprise an inner peripheral turn, an outer peripheral turn, and at least one turn therebetween, wherein the at least one turn between the two peripheral turns includes a generally planar top surface extending between two substantially parallel sidewalls;

the outer peripheral turn includes an inner and an outer sidewall, a generally planar top surface extending to the inner sidewall, and a facet extending between the top surface and the outer sidewall; and the inner peripheral turn includes an inner and an outer sidewall, a generally planar top surface extending to the outer sidewall, and a facet extending between the top surface and the inner sidewall.

23. The thin film write head of claim 22 wherein the winding has upper turns and lower turns and the outer peripheral turn and the inner peripheral turn are both upper turns.

24. The thin film write head of claim 22 wherein the winding has upper turns and lower turns and wherein both the upper outer peripheral turn and the lower outer peripheral turn include an inner and an outer sidewall, a generally planar top surface extending to the inner sidewall, and a facet extending between the top surface and the outer sidewall; and both the upper inner peripheral turn and the lower inner peripheral turn includes an inner and an outer sidewall, a generally planar top surface extending to the outer sidewall, and a facet extending between the top surface and the inner sidewall.

* * * * *